(12) United States Patent
Dansalami et al.

(10) Patent No.: US 11,719,400 B2
(45) Date of Patent: Aug. 8, 2023

(54) ELECTRICAL DEVICES WITH LIGHTS AND ASSOCIATED ZONE-SYNCHRONIZABLE LIGHTING SYSTEMS WITH BACK-UP POWER AND RELATED METHODS

(71) Applicant: Eaton Intelligent Power Limited, Dublin (IE)

(72) Inventors: Abdulkabir O. Dansalami, Atlanta, GA (US); Saivaraprasad Murahari, Peachtree City, GA (US); Kevin Zhong, Shanghai (CN); Huafei Huang, Shanghai (CN); Sophia Zhang, Shanghai (CN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 17/549,977

(22) Filed: Dec. 14, 2021

(65) Prior Publication Data

US 2022/0221117 A1 Jul. 14, 2022

Related U.S. Application Data

(60) Provisional application No. 63/135,791, filed on Jan. 11, 2021.

(51) Int. Cl.
*F21S 9/02* (2006.01)
*F21V 23/04* (2006.01)
(Continued)

(52) U.S. Cl.
CPC ............... *F21S 9/022* (2013.01); *F21S 8/033* (2013.01); *F21V 23/0435* (2013.01); *F21V 23/0464* (2013.01); *F21V 23/0471* (2013.01); *F21V 23/0485* (2013.01); *H05B 45/20* (2020.01); *H05B 47/115* (2020.01);
(Continued)

(58) Field of Classification Search
CPC . F21S 9/022; F21S 9/024; F21S 8/033; F21V 23/0435; F21V 23/0464; F21V 23/0471; F21V 23/0485; F21V 33/006; H05B 45/20; H05B 47/115; F21Y 2113/10; F21Y 2115/10
See application file for complete search history.

(56) References Cited

U.S. PATENT DOCUMENTS 6,010,228 A * 1/2000 Blackman ........... F21V 23/0442
362/802
6,045,232 A 4/2000 Buckmaster
(Continued)

*Primary Examiner* — Alan B Cariaso
(74) *Attorney, Agent, or Firm* — Eckert Seamans Cherin & Mellott, LLC

(57) ABSTRACT

Electrical devices with lights having onboard secondary power supplies are configured with synchronizable zone-based operation and/or color selectable modes. The electrical devices can be power receptacles and can be connected to a line input of a power circuit of a power grid and can also have the onboard secondary (emergency power) power supplies. The devices are configured so that respective lights can automatically illuminate upon motion detection in a zone and/or upon a disruption to the power circuit or to a powered state of a particular electrical device. The devices can be configured to allow a user to select different color or color temperatures using a color selection circuit.

24 Claims, 14 Drawing Sheets
(1 of 14 Drawing Sheet(s) Filed in Color)

(51) Int. Cl.
    *H05B 47/115*      (2020.01)
    *H05B 45/20*      (2020.01)
    *F21S 8/00*      (2006.01)
    *F21Y 113/10*      (2016.01)
    *F21Y 115/10*      (2016.01)
    *H05B 47/11*      (2020.01)

(52) U.S. Cl.
    CPC ........ *F21Y 2113/10* (2016.08); *F21Y 2115/10* (2016.08); *H05B 47/11* (2020.01)

(56) References Cited

U.S. PATENT DOCUMENTS

| | | | | |
|---|---|---|---|---|
| 2002/0071279 | A1* | 6/2002 | Katogi | H05B 45/20 |
| | | | | 362/317 |
| 2004/0218379 | A1* | 11/2004 | Barton | F21S 9/022 |
| | | | | 362/20 |
| 2014/0340222 | A1* | 11/2014 | Thornton | G08B 7/066 |
| | | | | 340/539.17 |
| 2015/0077243 | A1* | 3/2015 | Hooper | G08B 17/06 |
| | | | | 340/532 |
| 2015/0373796 | A1* | 12/2015 | Bahrehmand | H05B 45/325 |
| | | | | 315/129 |
| 2016/0377276 | A1* | 12/2016 | Furry | H05B 47/11 |
| | | | | 362/642 |
| 2017/0223807 | A1* | 8/2017 | Recker | H02J 9/02 |
| 2020/0227998 | A1* | 7/2020 | King | H02G 3/18 |
| 2021/0057856 | A1* | 2/2021 | O'Reilly | F21S 9/022 |
| 2021/0348731 | A1* | 11/2021 | McGovern | H05B 47/155 |

\* cited by examiner

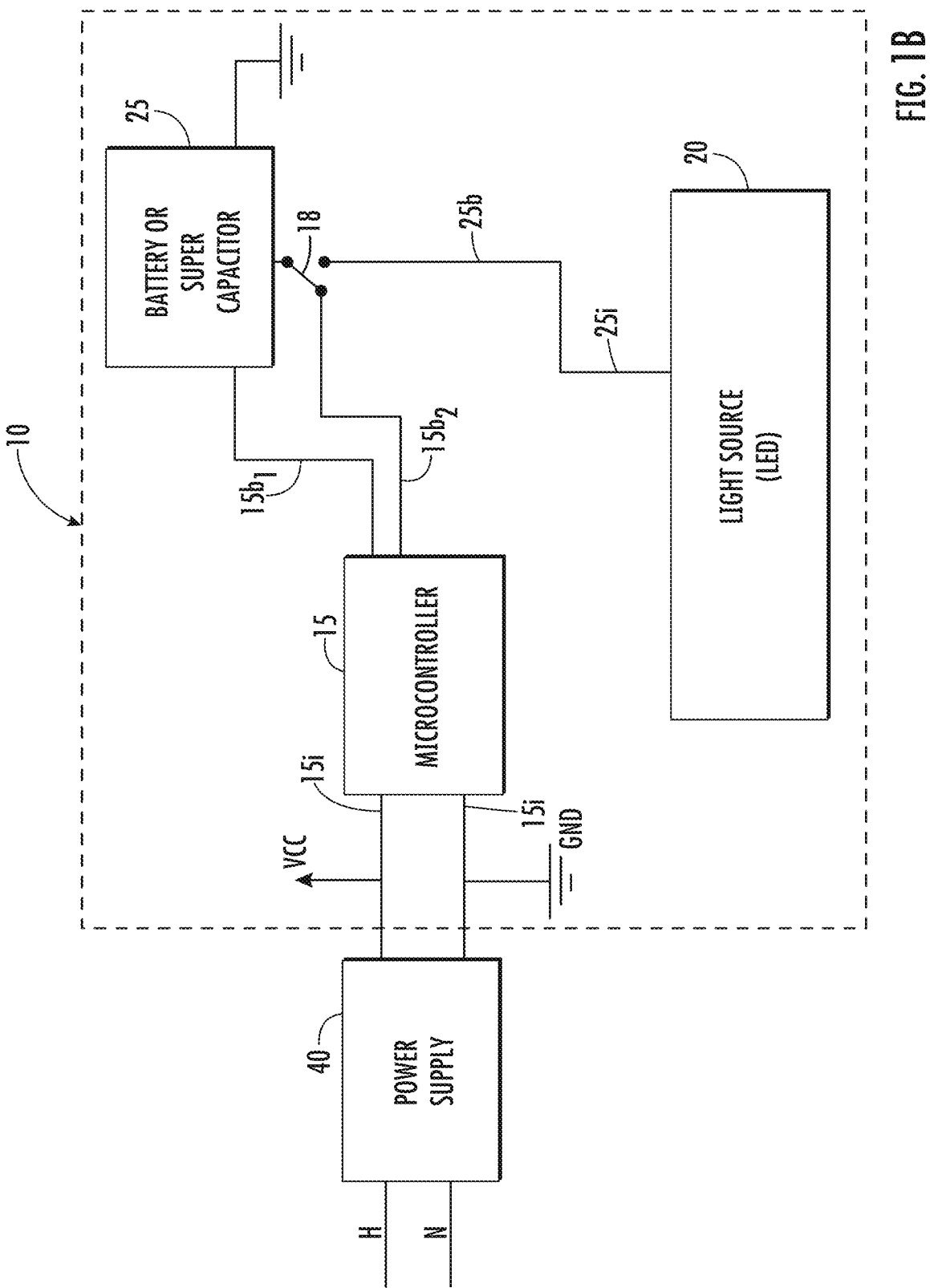

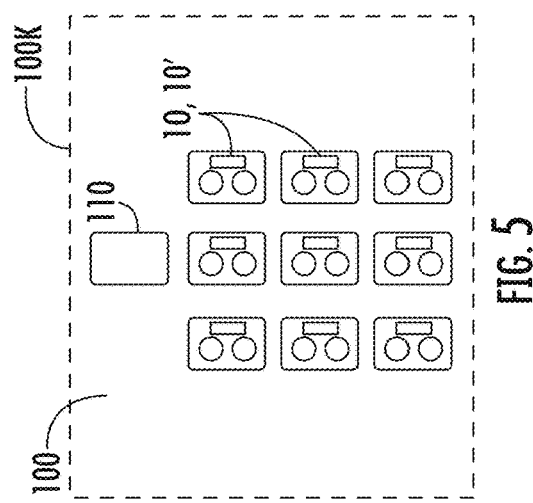
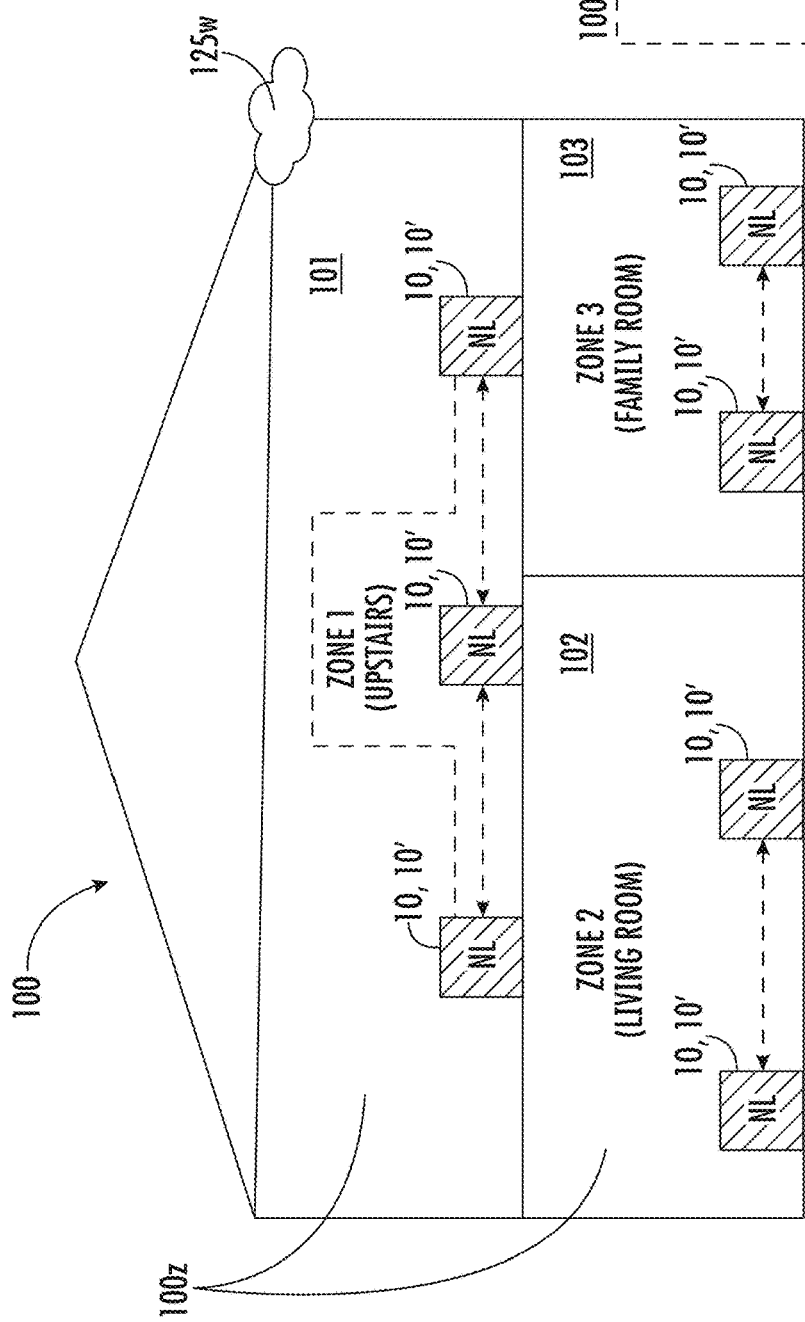
FIG. 5
FIG. 4

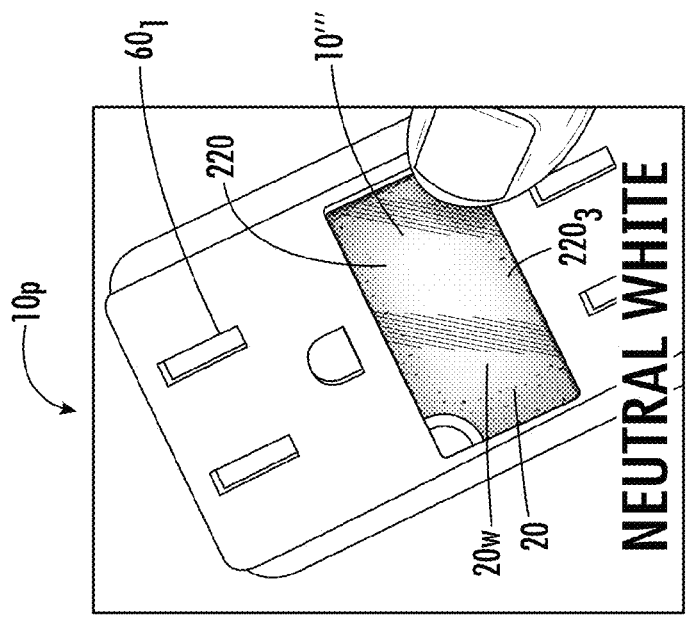
FIG. 10C NEUTRAL WHITE
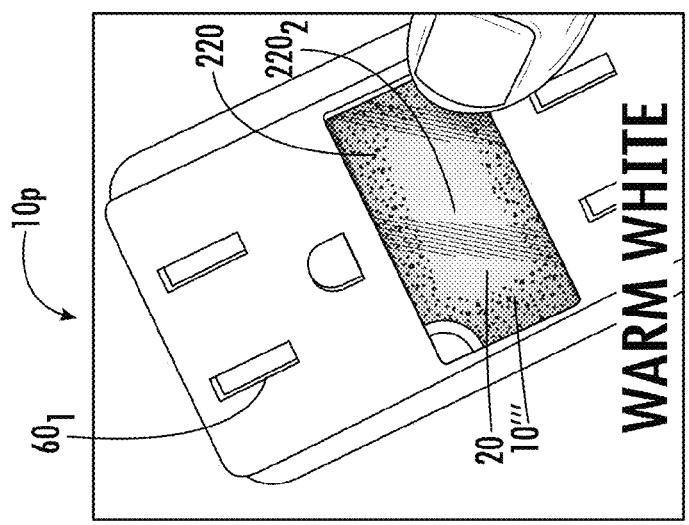
FIG. 10B WARM WHITE
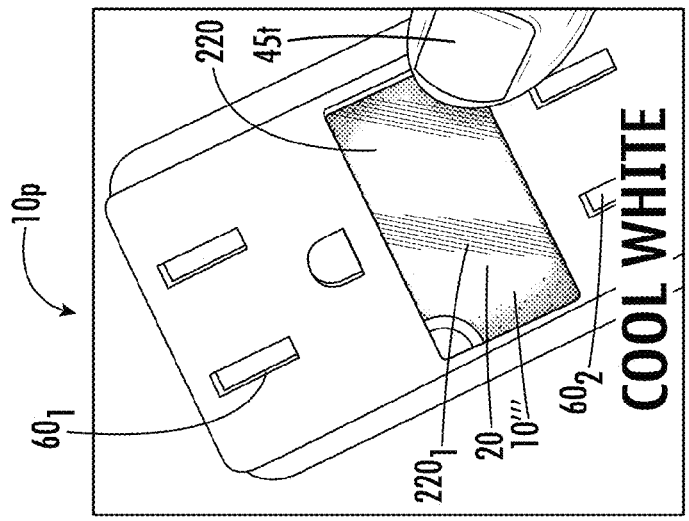
FIG. 10A COOL WHITE

ELECTRICAL DEVICES WITH LIGHTS AND ASSOCIATED ZONE-SYNCHRONIZABLE LIGHTING SYSTEMS WITH BACK-UP POWER AND RELATED METHODS

RELATED APPLICATIONS

This patent application claims the benefit of and priority to U.S. Provisional Patent Application Ser. No. 63/135,791, filed Jan. 11, 2021, the contents of which are hereby incorporated by reference as if recited in full herein.

FIELD OF THE INVENTION

The present invention relates to electrical devices such as power receptacles, switches, GFCIs, USB products and the like.

BACKGROUND OF THE INVENTION

Power to electrical devices with onboard lights such as power receptacles can be disrupted for various reasons.

SUMMARY OF EMBODIMENTS OF THE INVENTION

Embodiments of the present invention are directed to electrical devices with a back-up power supply that automatically powers a light source in/on the device when line power is disrupted.

Embodiments of the present invention are directed to zone-synched systems of devices with night lights that can operate upon motion detection by one of the devices in a corresponding zone.

The device can be a power receptacle with a cover having at least one electrical outlet, optionally a duplex receptacle.

Other embodiments are directed to methods of operating a light of a power receptacle. The methods include electrically powering a device using a primary power source, optionally using a load circuit, that automatically powers a light source using an onboard power source when the primary load circuit, optionally load circuit, is disrupted.

Embodiments of the invention are directed to an electrical device that includes: a housing; a microcontroller in the housing with electrical inputs coupleable to an external primary power circuit; a secondary power source in the housing; and a light coupled to the housing and coupled to the secondary power source. The light is configured to provide externally visible illumination. The microcontroller is configured to detect when power from the primary power circuit is disrupted and direct the secondary power source to power the light.

The device can be a power receptacle having at least one electrical plug-in socket, optionally the power receptacle can be an AFCI and/or GFCI power receptacle.

The device can have a light control user input in communication with the microcontroller.

The device can have a motion detection sensor coupled to the microcontroller.

The device can have a light sensor coupled to the microcontroller.

The device can have a sync module interface provided by the microcontroller and/or coupled to the microcontroller.

The device can have a transceiver coupled to or provided by the microcontroller.

The device can be configured to communicate over a low energy RF network.

The device can be a USB device and/or a switch device.

The device can have a charge control circuit coupled to the microcontroller, the secondary power source and the light.

The device can have a switch coupled to the microcontroller that electrically connects and electrically disconnects the secondary power source from the light, wherein the switch is operable by user input either via an external manual switch and/or an electronic user input whereby a user can turn the light on or off.

Other embodiments are directed to a lighting system that has a plurality of electrical devices, each comprising a microcontroller, a light source, a motion detector and an onboard secondary power supply. Each microcontroller is configured to direct a corresponding electrical device to electrically disconnect the light from the secondary power supply or electrically connect the light source to the secondary power supply. Each of the plurality of electrical devices are electronically assignable to one of a plurality of different zone locations correlated to different defined subspaces of a larger physical space. All electrical devices assigned to a respective zone location wirelessly communicate with other electrical devices in that zone location so that motion detected by one electrical device in the respective zone location causes other of the electrical devices in that respective zone location to turn corresponding lights On.

The lighting system can have a sync module that wirelessly communicates with the plurality of electrical devices over a computer network.

Each of the plurality of electrical devices can be configured to couple to a primary power circuit of a private or public power grid to provide a primary power source for the electrical device.

The electrical devices communicate with each other over a low energy RF network.

The lighting system can have a user interface provided by a light control APP on a mobile device of a user whereby the user can turn a light of a selected electrical device On or Off and can check an operative status of lights of different electrical devices in different zone locations.

Each light of the plurality of electrical devices can be remotely controllable by a user over a wireless computer network.

The system can have a light control APP accessible on a mobile device of the user whereby the user can check power status of the primary power circuit via a light control APP on a mobile device of the user.

The electrical device in the respective zone location can detect a motion using its motion sensor, send an ultra-low power RF signal to the other electrical devices in that zone location to turn their lights On. The lights of the electrical devices in other zones locations can remain Off until motion is detected by a motion detector of a respective electrical device in one or more of the other zone locations.

The electrical devices can be power receptacles.

Yet other embodiments are directed to methods of lighting spaces. The methods include: providing a plurality of electrical devices, each with at least one light, a motion detector, and an onboard secondary power supply; defining a zone relationship of different electrical devices in different defined zones; powering the electrical devices with an external primary power circuit during normal operation; detecting a termination of a powered state of one or more of the electrical devices from power provided by the primary power circuit; automatically powering the light of the one or more electrical devices using a corresponding secondary power supply; and upon detecting motion by one of the electrical devices in a first zone of the defined zones, automatically electronically directing other electrical devices only in the first zone to turn on and illuminate their lights.

The method can also include automatically turning all lights of the electrical devices in the first zone Off at a defined time from when motion is last detected by a last to detect of the motion detectors in that defined zone.

The method can also include providing a light control APP that wirelessly communicates with the plurality of electrical devices over a wireless computer network.

The method can include sending a power outage alert to a mobile device of a user associated with the mobile device having the light control APP. The alert can vary to define a type of power outage that occurs for an affected zone and/or one or more electrical device within the affected zone.

The electrical devices can be power receptacles.

The electrical devices can be AFCI power receptacles, GFCI power receptacles, AFCI/GFCI power receptacles. A first type of power outage can be identifiable as an internal power disruption caused by an AFCI or GFCI fault. A second type of power outage can be identifiable as a power outage upstream of the power receptacles.

The electrical devices can be USB devices (e.g., have USB ports).

The electrical devices can be switches.

The device can include a color circuit coupled to the microcontroller. The color circuit can include at least on light emitting diode (LED). The color circuit can also include an LED driver and a light select circuit configured with a light selection mode that, when active, cycles the at least one LED to serially output a plurality of different defined light outputs. The device can also include a user input control that can be configured to allow a user to select one of the plurality of different defined light outputs.

The plurality of different defined light outputs can include a plurality of different color temperatures for a respective color, optionally white.

The at least one LED can be provided as first and second sets, optionally the sets can be provided as pairs, of LEDs which can be configured to be serially activated to generate first and second light outputs of the plurality of different defined light outputs.

The device can be a power receptacle with at least one electrical plug-in socket. The device can have a light lens window configured to allow the at least one LED to illuminate light therethrough. The user input can be a touch input provided by the light lens window to the microcontroller.

Further aspects of the present invention are directed to methods of allowing a user to select a color and/or a color temperature of a light of an electrical device. The methods include: providing an electrical device comprising at least one light emitting diode (LED), at least one LED driver, a light lens window and a microcontroller; accepting a first user input to activate a color selection mode when the at least one LED is not illuminating and/or accepting a first user input to activate a color selection mode which turns off any of the at least one LED which is in a powered on/illuminating state prior to allowing the device to enter the color selection mode; illuminating the at least one LED light in a blinking pattern through the light lens window in response then to the first user input; illuminating the at least one LED to generate a different light output at a current or default brightness level, optionally at a constant illumination light output through the light lens window, to indicate activation of the color selection mode; cycling through a plurality of different defined colors and/or color temperatures of light outputs which are serially illuminated through the light lens window; accepting a second user input to select one of the different defined colors and/or color temperatures of light outputs; and exiting the color selection mode and turning off the at least one LED.

The plurality of different defined colors and/or color temperatures of light outputs can be provided as plurality of different color temperatures of a respective color.

The electrical device can be a power receptacle.

The first and second accepting user input actions can be carried out by a user touching the light lens window.

The exiting the color selection mode can be automatically carried out when (a) a user presses and holds the light lens button for a defined time of under 10 seconds, typically within 2-5 seconds, during and/or after the cycling as confirmed by a flashing light signal from the light lens window and (b) when a user fails to press the light lens button within a defined time after initiating the color selection mode.

Further features, advantages and details of the present invention will be appreciated by those of ordinary skill in the art from a reading of the figures and the detailed description of the preferred embodiments that follow, such description being merely illustrative of the present invention It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1B is a circuit diagram of another example electrical device according to embodiments of the present invention

FIG. 4 is a schematic illustration of an example zone-synchronized light system according to embodiments of the present invention.

FIG. 5 is a schematic illustration of a kit with a sync module and a plurality of electrical devices configured for use in zone-synchronized lighting operation according to embodiments of the present invention.

FIGS. 10A-10C are partial front perspective views of example power receptacles configured with a light output that is adjustable in color and/or color tone based on user input according to embodiments of the present invention.

DETAILED DESCRIPTION

Figure 1A:
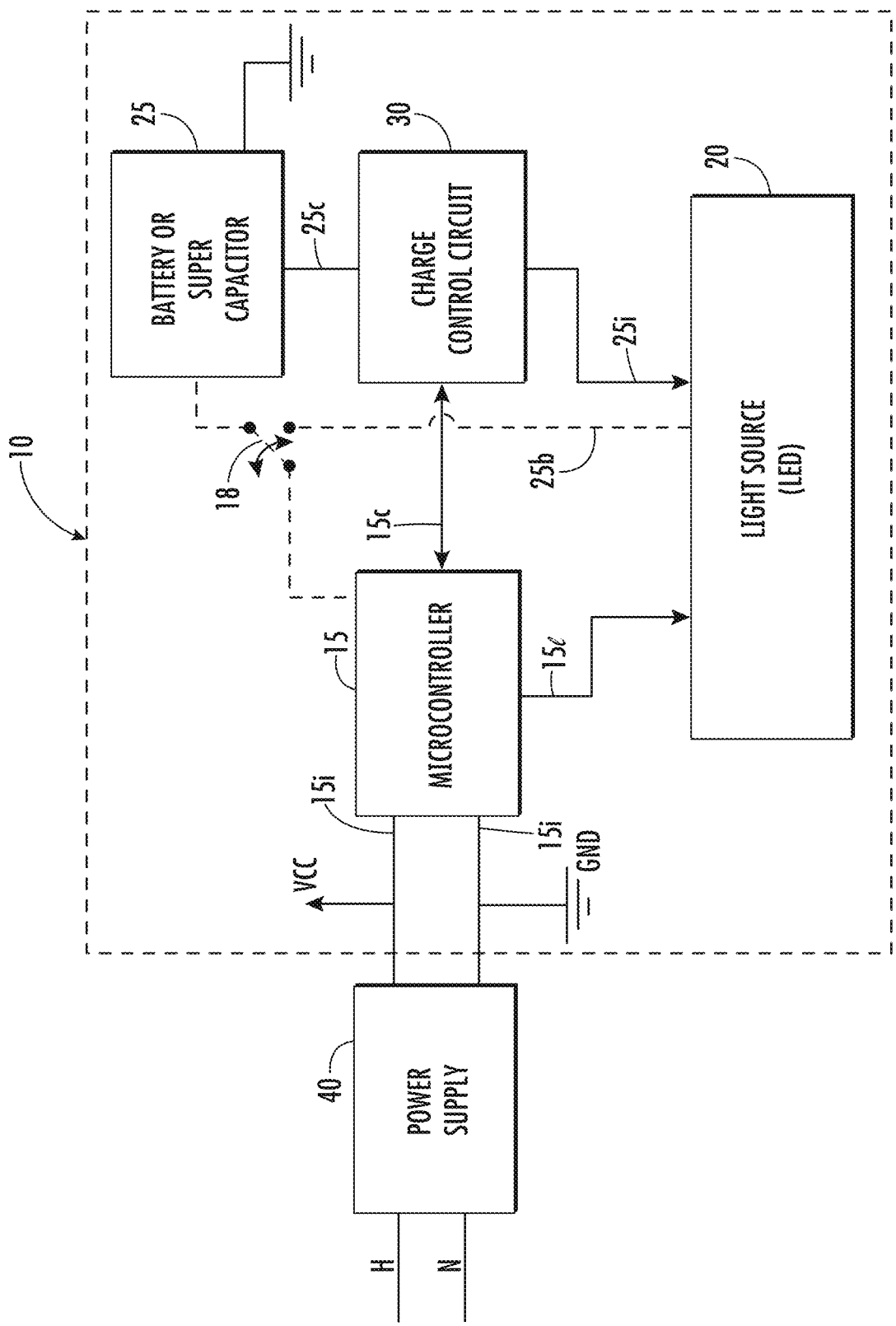
FIG. 1A is a circuit diagram of an example electrical device according to embodiments of the present invention.

The present invention now will be described more fully hereinafter with reference to the accompanying drawings, in which illustrative embodiments of the invention are shown. Like numbers refer to like elements and different embodiments of like elements can be designated using a different number of superscript indicator apostrophes (e.g., 10, 10', 10'',10'''). Abbreviated versions of the word "Figure" such as "FIG." and "FIG." are used interchangeably in the application. Broken line boxes in the figures indicate optional features or steps.

In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

The term "about" when used with respect to a number refers to numbers in a range of +/−20% of the noted value.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Turning now to the figures, FIG. 1A illustrates an exemplary electrical device 10. The device 10 comprises a microcontroller 15, a light 20 and an onboard secondary power supply or source 25. The light 20 can provide an externally visible illumination when operative. The light 20 can comprise any suitable light source such as, for example, one or more LED (light emitting diode), a laser, or even a neon lamp, for example. The secondary power source 25 can cooperate with the light 20 to provide low-light illumination for a defined On time of a range of 10-60 minutes or 10-30 minutes, in some embodiments. In some embodiments, the secondary power source 25 can power the light 20 such as an LED light source 25, providing an LED power draw can be in a range of about 100 μA-1000 μA for a relatively long battery discharge powering time of 30-60 minutes or more. In some embodiments, an LED power draw can be in a range of about 5 mA-10 mA at about 3.3 V for about 30 minutes. For a neon lamp, the voltage to power such a light 20 can be in a range of about 10-60V.

The microcontroller 15 can have electrical inputs 15$i$ for electrical Vcc and electrical ground inputs of an external or primary power circuit 40 with a hot side branch H and a neutral branch N. Vcc is the voltage provided from the primary power circuit 40 and, in some embodiments, can be in a range of about 1.8V to about 5.5V, which can be rectified and regulated by line-in voltage. The microcontroller 15 can be configured to control/direct when the light 20 is turned On and Off. The microcontroller 15 can have a light control output 15*l* that is connected to the light 20. As employed herein, the term microcontroller 15 refers to a programmable analog and/or digital device that can store, retrieve, and process data including a digital signal processor (DSP); a programmable logic device (PLD); a combination of a plurality of logic gates; or any suitable processing device or apparatus.

The electrical device 10 may also comprise a charge control circuit 30 that is coupled to the secondary power supply 25 and may also optionally be coupled to the microcontroller 15. Thus, for example, in some embodiments, the microcontroller 15 can also be configured to communicate with the charge control circuit 30 to maintain a charge of the onboard secondary power supply 25. The microcontroller 15 can communicate with the charge control circuit 30 via a bidirectional connection path 15*c*. The charge control circuit 30 is not required to constantly charge the secondary power supply 25. Rather, the microcontroller 15 can direct the charge control circuit 30 to charge the secondary power supply 25 when the microcontroller 15 detects a drop in a voltage level of the secondary power supply 25 warranting such action. The microcontroller 15 can direct a 120V charge to the secondary power supply 25 when needed. However, the charge control circuit 30 is not required and is not required to communicate with the microcontroller 15 (e.g., no communication or no two-way or bidirectional communication is required). The charge control circuit 30 may be configured to trickle charge the secondary battery or otherwise maintain a charge or provide a supplemental supply of power to the secondary power supply 25 or to the light 20, when needed.

As shown in FIG. 1A, the charge control circuit 30 can be electrically connected to the secondary power supply 25 via a first connection path 25*c* and to the light 20 via a second connection path 25*i* to provide the power to the light 20 indirectly from the secondary power supply 25. Alternatively, or additionally, as shown in broken line, the secondary power supply 25 can be directly electrically connected to the light 20 via a third connection path 25*b*. The microcontroller 15 can be coupled to a switch 18 in the third connection path 25*b* to control engagement with the light 20. The switch 18 can be normally open or a normally closed switch.

As will be understood by one of skill in the art, switches may be used to connect/disconnect the electrical coupling of one or more of: the microcontroller 15, the secondary power supply 25, and/or the light 20.

The external (primary) power circuit 40 can be provided by a line side circuit of a power grid whether private or public. The external power circuit 40 can provide a primary power source to a house, apartment, office building or other interior or exterior space, for example. The primary power circuit 40 can provide the Vcc and ground inputs. The secondary power supply 25 can comprise a battery or capacitor or both. Where a capacitor is used, it can be a super capacitor. Electric double-layer capacitors are known as supercapacitors, electrochemical double layer capacitors (EDLCs) or ultracapacitors and have an unusually high energy density when comparted to conventional capacitors, typically several orders of magnitude greater than a high-capacity electrolytic capacitor. For example, an ultracapacitor from Tecate Group (San Diego, Calif., USA), optionally a PowerBurst® product or a supercapacitor from Cooper Bussmann/Eaton Corporation (Cleveland, Ohio, USA). The super capacitor or ultracapacitor can be configured with a rated voltage of capacitor in a range of about 2.7V-3.3V, and capacitance range from 0.5 to 10 farad or more. Other types of secondary power supplies 25 may be used, such as, for example rechargeable batteries, such as Ni-CD, Lithium-Ion material or non-chargeable batteries, such as Lithium and Zinc/Monovalent silver oxide material.

The light 20 can be normally powered by the primary power source 40 and only by the secondary power supply 25 for emergency or back-up powered operation.

Referring to FIG. 1B, no charge control circuit 30 is required and/or the microcontroller 15 is not required to have a direct connection 15*l* to the light 20. The microcontroller 15 can be coupled via electrical connection path 15*b*$_2$ to a switch 18 in the electrical connection path 25*b* between the secondary power supply 25 and the light 20. The microcontroller 15 may also or alternatively be connected to the secondary power supply 25 via electrical connection path 15*b*1.

Figure 1C:
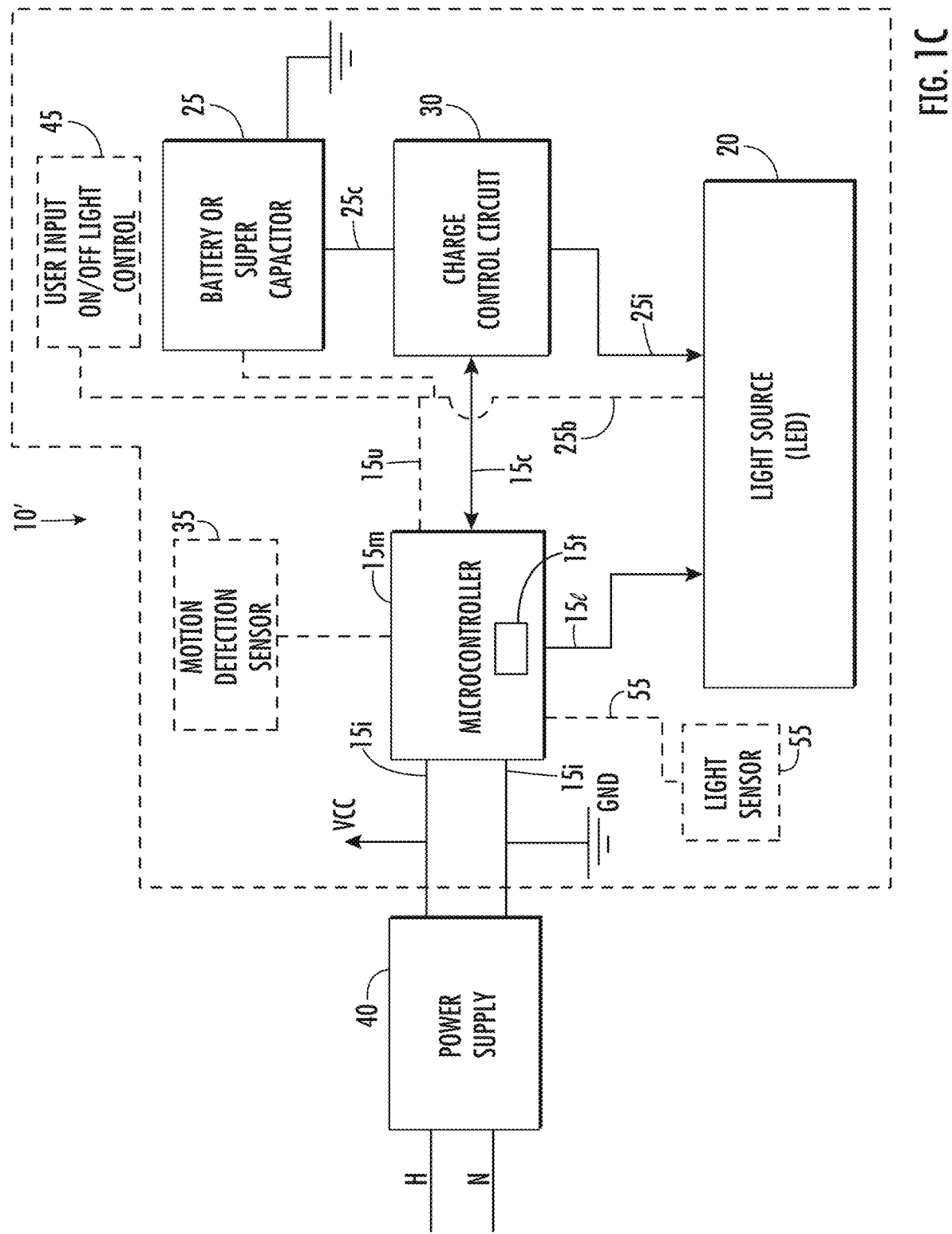
FIG. 1C is a circuit diagram of another example electrical device according to embodiments of the present invention.
Figure 6:
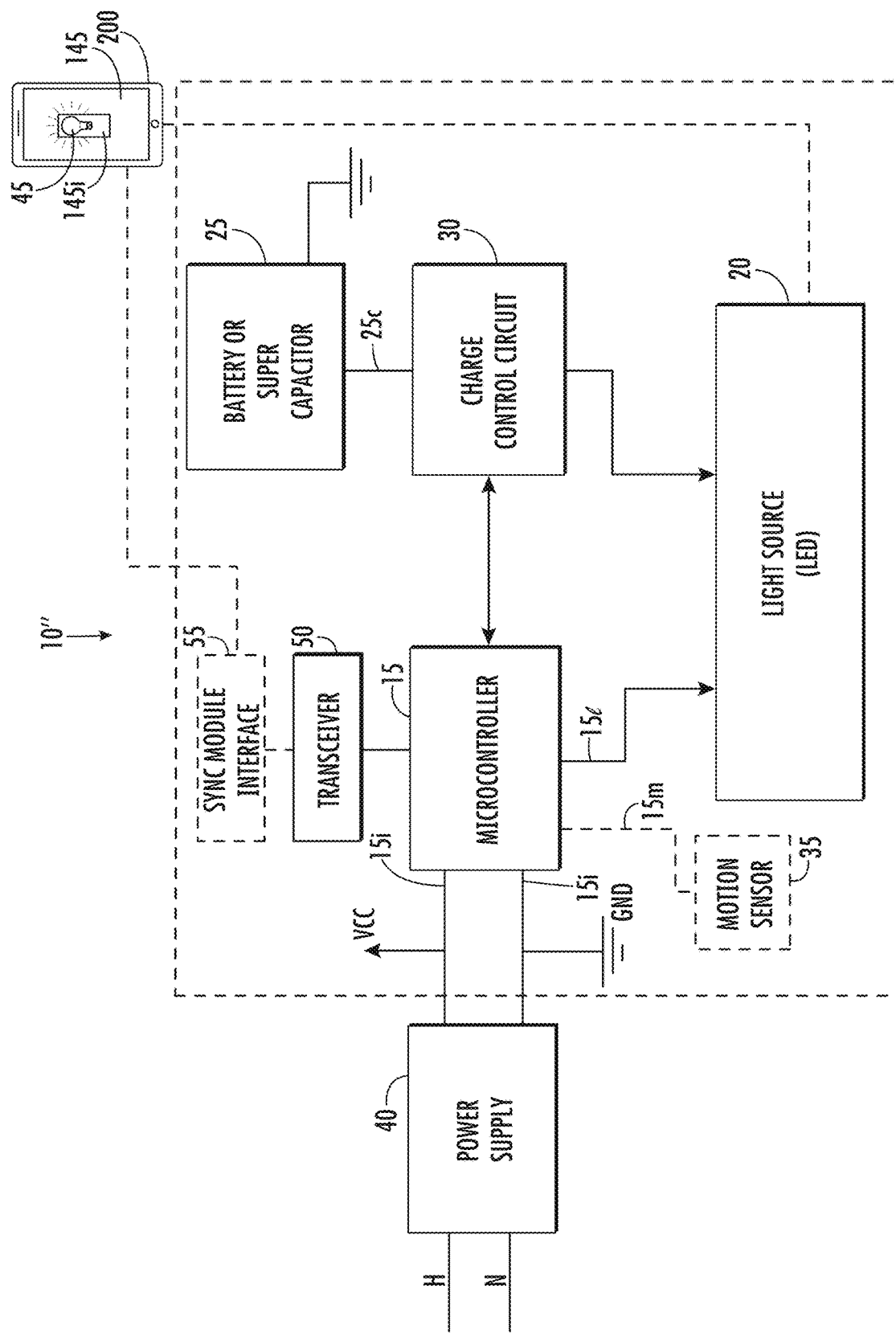
FIG. 6 is a schematic illustration of an electrical device with a transceiver and microcontroller configured to be controlled by a sync module and optionally a user via a light control APP according to embodiments of the present invention.

FIG. 1C illustrates that the electrical device 10' can also include a motion detector/motion detection sensor 35 coupled to the microcontroller 15 via connection 15*m* that can direct the light to illuminate if motion is detected proximate the electrical device 10'. The motion detector 35 can comprise, for example, a camera, Hall-effect sensors, optical light emitter and detector pair, infra-red sensors, ultrasonic sensors, gesture sensors or radar wave sensors or combinations of the above or other suitable motion detector configurations FIG. 1C also illustrates that the electrical device 10' can have a user input 45 that allows a user to turn the light 20 either On or Off. As will be discussed further below, the user input 45 can be provided as a manual input and/or via an electronic input that may be accessible by an APP 145 (FIG. 6). A timer 15*t*, which may be provided by the microcontroller 15, may be used to have the light 20 return to the Off state if a user does not turn the light Off when in a defined time. The On time may be adjustable and set by a user and may have a default setting of suitable time frame, such as, 5-10 minutes, for example.

The electrical device 10, 10' can also be configured to only direct the light 20 to illuminate if a proximity space is dark or has reduced lighting relative to a defined light threshold. Thus, the electrical device 10, 10' may also include a light sensor 55 as shown in FIG. 1C. The light sensor 55 can be connected to the microcontroller 15 via connection path 15*s*. The light sensor 55 can be provided as one or more types of light sensors including, for example, a CDS photocell (also known as a light dependent resistor where resistance changes based on the amount of light), an ambient light sensor (ALS) and/or a digital light sensor.

The electrical device 10, 10', 10"(FIG. 6), 10' (FIG. 10A-10C) can be configured, for example, as a switch, GFCI, AFCI, USB product, smart dimmer product or night light device and the like and any combinations of these example devices.

Figure 2B:
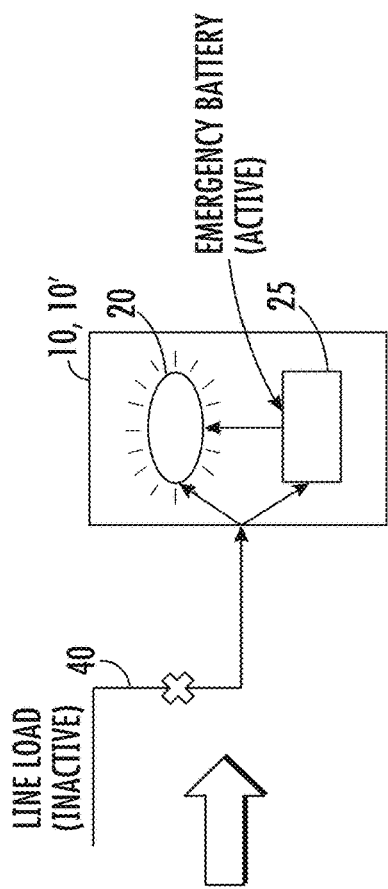
FIG. 2B is a schematic illustration of the example electrical device shown in FIG. 2A but with the light powered by an onboard secondary power supply.
Figure 2A:
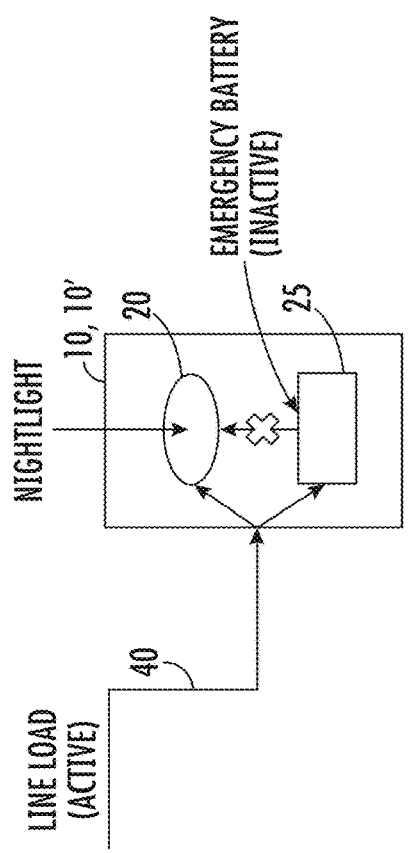
FIG. 2A is a schematic illustration of an example electrical device with a light powered through a line load power circuit according to embodiments of the present invention.

Referring to FIGS. 2A and 2B, in some embodiments, the electrical device 10, 10' can be configured so that when the line load is active, e.g., the primary power circuit 40 is active/powered and powering the electrical device 10, 10', the light 20 is powered by the primary power circuit 40 and the secondary power supply 25 is inactive, disconnected from the light 20. The electrical device 10, 10' is configured to detect when load to the device 10, 10' is disrupted and then provides power to the light 20 from the secondary power supply 25.

Figure 3:
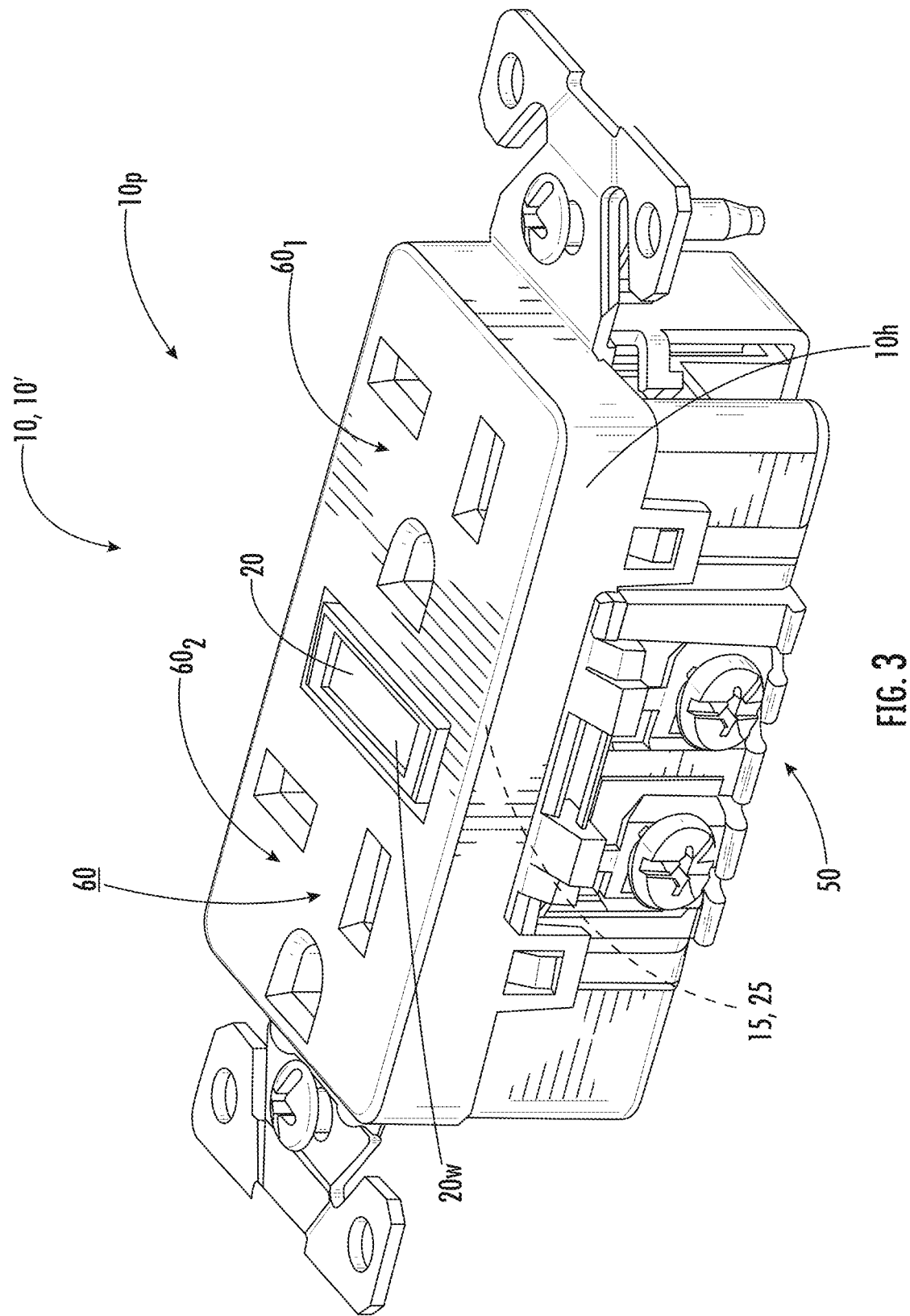
FIG. 3 is a side perspective view of an example power receptacle comprising a light source and an onboard secondary power source according to embodiments of the present invention.

As shown in FIG. 3, the electrical device 10, 10' can be a power receptacle 10*p*. The term power receptacle 10*p*, can also be interchangeably referred to as a "receptacle" or "outlet". As is well known, a power receptacle is a point of connection between electrically powered devices, such as computers, and a power distribution system, such as a power distribution circuit 40 of a structure such as a building. The power receptacle 10p can have a housing 10h and can be configured, for example, as an in-floor, in-wall device, surface-mount device, or a device integrated into another device or even as an appliance.

The power receptacle 10p can be configured as a single plug-in receptacle 60. In some embodiments, the receptacle 10p can be configured as a single gang, dual gang or duplex receptacle, or other multiple gang receptacle. FIG. 3 illustrates that the power receptacle 10p can comprise two plug-in receptacles $60_1$, $60_2$ providing a duplex receptacle configuration. The light 20 can be configured to illuminate via a translucent window 20w between the two receptacles $60_1$, $60_2$. However, the light 20 can be configured to illuminate via other windows included about the perimeter of the device, for example. The receptacle 10p can be a three-phase receptacle of suitable amperage and voltage rating for residential or commercial use. In some particular embodiments, the receptacle 10p can be a 15A or 20A rated device.

The light 20 can be configured to emit with a first color when powered by the primary power circuit 40 and a second different color when powered by the secondary power supply 25.

The electrical device 10, 10', 10",10''' can be a plug-in device that can have external terminals that plug into an electrical power receptacle.

Referring to FIG. 4, the electrical devices 10, 10' can be provided as a system of electrical devices 100 configured for wireless network communication with a plurality of electrical devices related by a defined zone 100z, shown as three defined zones, 101, 102, 103. Each defined zone 100z can have one or more electrical devices 10, 10'. Different numbers of electrical devices 10, 10' with respective onboard lights 20 can be used in different zones 100z. The electrical devices 10, 10' can be configured to allow multiple such devices 10, 10', which may be described as nightlight products, to connect to each other within a defined zone 100z. A motion detector 35 (FIG. 1C) in a first electrical device 10, 10' in one zone 100z can direct a corresponding light 20 to turn On when it senses motion, such as a person walking by. The electrical devices 10, 10' can be configured to communicate via a wireless network. The first electrical device 10, 10' in the one zone 100z can be configured to signal to the other devices 10, 10' in the same zone 100z (e.g., same range/room) that they should all turn their respective lights 20 On. The first electrical device 10, 10' can be configured to send a signal to all other electrical devices 10, 10' in the same zone 100z to turn their respective lights On, using a low power (or ultra-low power) RF signal of 5 mW or less, for example. The communication network and/or protocol providing the RF signal can be off the shelf or custom RF or Bluetooth or other low energy RF network/protocol such as, Z-Wave, ZigBee or any similar network or protocol. These communication/control protocols have very low current draw (e.g., a few milli-amperes) during steady state, RX/TX modes. The term "low energy" when referring to RF networks and protocols refers to those RF/communication/control networks and protocols that operate with about 5 mW or less during the TX and RX operations.

The lights 20 of the electrical devices 10, 10' in in all other zones 100z can remain Off until a motion is detected by one of the electrical devices 10, 10' in that zone 100z. Upon activation of a respective light 20, the electrical devices 10, 10' can all operate on a timer 15t (FIG. 1C) after they turn On. This timer 15t can be synchronized so that each time motion is detected by a motion detector 35 in a respective zone 100z, a reset (light) On time signal can be sent to all other electrical devices 10, 10' in that zone 100z to operate on a common light duration On time and this time can be reset within a respective zone 100z every time motion is detected by a motion detector 35 of an electrical device 10, 10' in a respective zone 100z. When the set time of the timer 15t runs out or expires, a respective electrical device 10, 10' can turn its corresponding light 20 Off.

A user, such as a home-owner or resident, can electronically direct (e.g., over a wireless network) or manually (e.g., using an external input member 45m (FIG. 8) such as a touch screen lens, push button or external paddle switch) any individual or zone of electrical devices 10, 10', 10",10''' to remain with a respective light 20 On for an extended period and thereby by-pass or disengage the timer 15t.

FIG. 5 illustrates that the system 100 can be provided as a kit 100k with a plurality of electrical devices 10, 10' and a sync module 110 which can be used to define the zone relationship by correlating a physical location and electronic address for each device 10, 10' at set-up. The sync module 110 can communicate with each device 10, 10' and a wireless network 125w (FIG. 4) in a building.

FIG. 6 illustrates that the electrical device 10" can include a (radio) transceiver 50 and a sync module interface 55, both or either one of which may be provided by the microcontroller 15 or directly or indirectly coupled to the microcontroller 15. For example, the microcontroller 15 can be configured as or be coupled to a wireless microchip module with general purpose input output (GIPO) connections, a receiver and a transmitter and various sensor, antenna and power inputs/outputs as is well known to those of skill the art. For example, a separate sync module 55 can be provided and connect to the local wireless communication system and to the electrical devices 10, 10', 10",10'''. For example, the sync module 55 can be provided as part of a smart home control system. By way of example only, an RN171 microchip from Microchip Technology, or any suitable wireless module microchips may be used for the microcontroller 15 and/or the sync module 55, for some embodiments.

Still referring to FIG. 6, the electrical device 10" can be configured to wirelessly (and remotely and/or locally) communicate with a user via a light control APP 145 providing a user input 45. The light control APP 145 can be accessible via an icon on a mobile device 200 of a user. The term "APP" refers to a computer program configured to provide defined functionality on a computer including pervasive computing devices and/or mobile devices such as an electronic notebook or notepad, smart phone, laptop, and the like. In some embodiments, the functionality of the APP may be accessible via an icon 145i on a display of the computer and/or may be accessed by other user input, such as input provided by a typed or spoken user interface of the computer. The computer program may comprise computer program code configured to reside in a memory of the computer to be accessed and executed by a processor or other computing circuit of the computer, but the embodiments of the invention are not limited thereto. In some embodiments, the computer program code, processor, and/or memory may be located remotely from the computer providing the functionality, such as in a networked environment, or "cloud."

The light control APP 145 can be configured to have suitable network security for access by any user. The access may be controlled using an "electronic key" or "digital key" such as a defined electronic alphanumeric code that is associated with a respective user. The digital key can be provided to a mobile device 200 having a unique identity code associated with a mobile device of a respective user, such as, for example, an International Mobile Equipment Identity (IMEI) and/or an IP address. The digital key can be provided by an APP 145 or other electronic key generation and/or identity verification system. The digital key can be provided by an authorized user database and/or user access system in communication with an authorized user database. The digital key can be provided via a communications interface including, for example, a Bluetooth communication connection with a respective mobile device. The digital key can be entered via a Human Machine Interface (HMI) such as via a display user interface or a keypad or reader input and may use a two-step verification protocol by sending real time alphanumeric digital keys to a user to allow a secure light On and/or light Off command be wirelessly sent to various electrical devices providing a light or lights 20 in one or more zones 100z.

Figure 7:
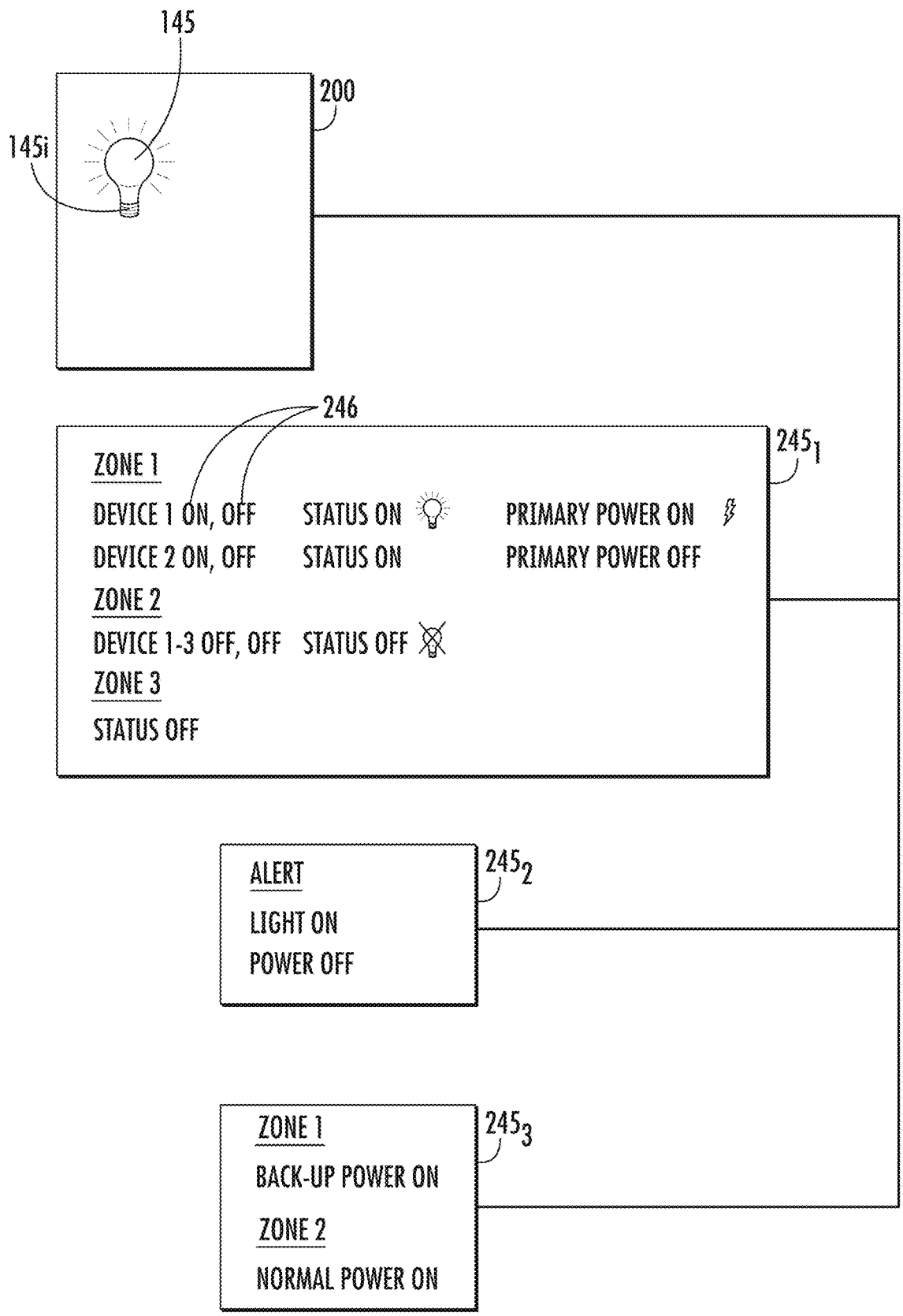
FIG. 7 is a schematic illustration of example screen displays of a light control APP according to embodiments of the present invention.

FIG. 7 illustrates example control/input pages 245$_1$, 245$_2$, 245$_3$ that can be accessed via the icon 145i of the light control APP 145. As shown, one page 245$_1$ can identify the devices 10, 10', 10" by zone location 100z (zone 1, zone 2, zone 3, for example). Each device 10, 10', 10" can identify its status as primary power active (On) or disrupted (Off) and current light status as On or Off. Each may have a graphic symbol for On and Off (light bulb illuminating or off or marked with X). For primary power, a lightning bolt graphic can be used when active and an X through the lightning bolt graphic when the primary power is off. However, other status indicators may be used.

Each electrical device 10, 10', 10",10''' can be controlled via the light control APP 145 to have an On or Off state by the electronic input 246 on the page 245$_1$. A user can customize the name of a particular zone 100z using the APP 145 according to their use, e.g., kitchen, bedroom 1, family room, for example.

A second page 245$_2$ can be used to provide an alert to a user when primary power is Off and/or when a light is On, for example. This may help a user know when a fuse is blown or when power to the entire house is disrupted and the alert can be sent remotely to one or more mobile devices 200 connected to the lighting system 100. The alert can include an audible alert, that can have a sound and decibel level that can be set by a user.

A third page 245$_3$ can provide a status that indicates whether any secondary power supply 25 is activated on any device 10, 10', 10" and/or if primary power 40 is disrupted to any device 10, 10', 10" and/or zone 100z.

Figure 8:
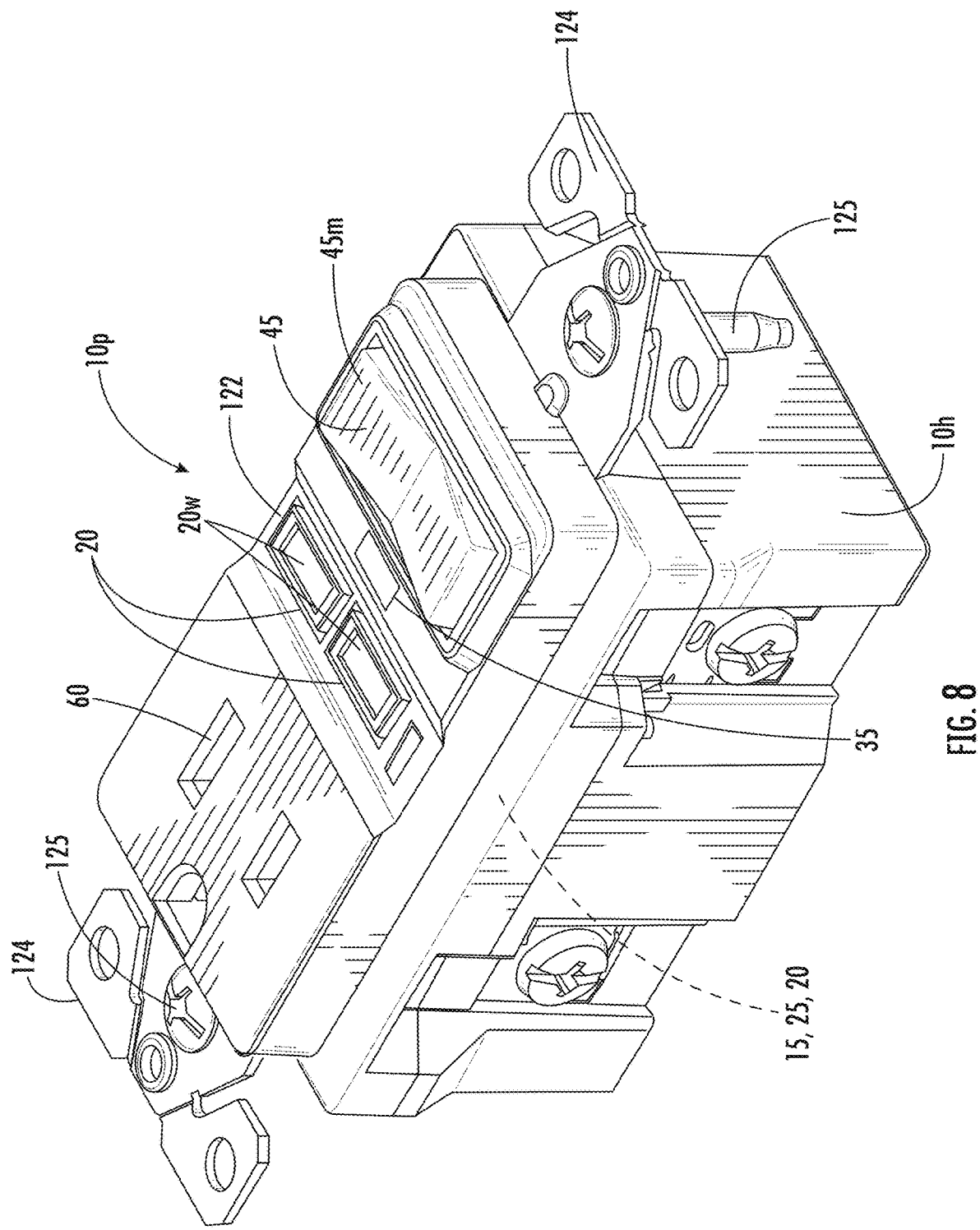
FIG. 8 is a side perspective view of an example power receptacle with a light and On/Off switch according to embodiments of the present invention.

FIG. 8 illustrates another example of a power receptacle 10p providing the electrical device 10, 10', 10", As shown, the power receptacle 10p includes a test and reset input members 120, 121, respectively. The input members 120, 121 can reside adjacent the light output window 20w, The power receptacle 10p can include the manual input 45m for the user input 45 that can allow a user for turning the light 20 On and Off.

As shown, the plug-in receptacle 60 can be configured as a 3-prong socket but a two-prong socket may also be provided.

As shown in FIG. 8, the receptacle 10p can include outer bracket ears 124 that can include mounting (typically threaded) members 125 that can be used to attach to a desired structure for mounting the power receptacle 10p.

The receptacle 10p can be configured as an Arc Fault Circuit Interrupter (AFCI) and/or Ground Fault Circuit Interrupter (GFCI) receptacle. As is well known, AFCI and GFCI receptacles are among a variety of overcurrent protection devices used for circuit protection and isolation. A GFCI is a device that shuts off an electric circuit when it detects that current is flowing along an unintended path to reduce the risk of electric shock. The GFCI can be manually reset by pushing the reset button. An AFCI can be designed to help prevent fires by detecting an unintended electrical arc and disconnecting the power before the arc starts a fire.

Thus, the power receptacle 10p may be configured for other AFCI and/or GFCI applications. For example, as shown in FIG. 8, the receptacle 10p can be a GFCI and/or AFCI receptacle unit with an external user-actuatable button or member on the face of this power receptacle unit 10p. There power receptacle 10p can include a manual input 45m that can be manually used to illuminate the light 20 whether by the primary power circuit 40 of the secondary power supply 25. The manual input 45m can be used as a simple switch or it can be wired for GFCI (or AFCI) protection. The power receptacle 10p can have a test/reset input(s) 122 also on the face of the unit.

The electrical device 10, 10', 10",10''' may be configured to operate the light 20 without the primary power circuit 40 due to several conditions. For example, a AFCI or GFCI device can itself terminate power connection to the primary power circuit 40 when a fault condition (current in an unintended path or an unintended electrical arc) is detected.

Power from the power circuit 40 may also be disrupted at a fuse box or outside and upstream of a respective building in the power grid.

The electrical device 10, 10', 10",10''' can be configured to direct a light output from a light 20 to be in different colors or tones of color based on different defined conditions and/or parameters. The colors may be based on what type of power outage occurs at a particular device 10, 10', 10". For example, a first color when the electrical device 10, 10', 10" is no longer connected to the power circuit 40, a second color when power from the power circuit 40 is lost, and a third color when more than one device is no longer powered by the power circuit 40 indicating a grid power disruption. These different actions can provide different colors that reflect, for example, whether power issue is due to a power outage of the power grid, a fuse in a branch circuit or onboard an AFCI/GFCI disconnection. The light may be configured to have a pulsed output when time from powering the light 20 is beyond a defined time threshold of 30 minutes, for example, and the frequency can increase or decrease as the time from start of secondary power powering increases. Thus, the actions can output a light color and/or a visual output presentation that changes based on a cumulative time from a disruption of a powered state by the primary power circuit 40 of the electrical device 10, 10', 10".

Figure 9:
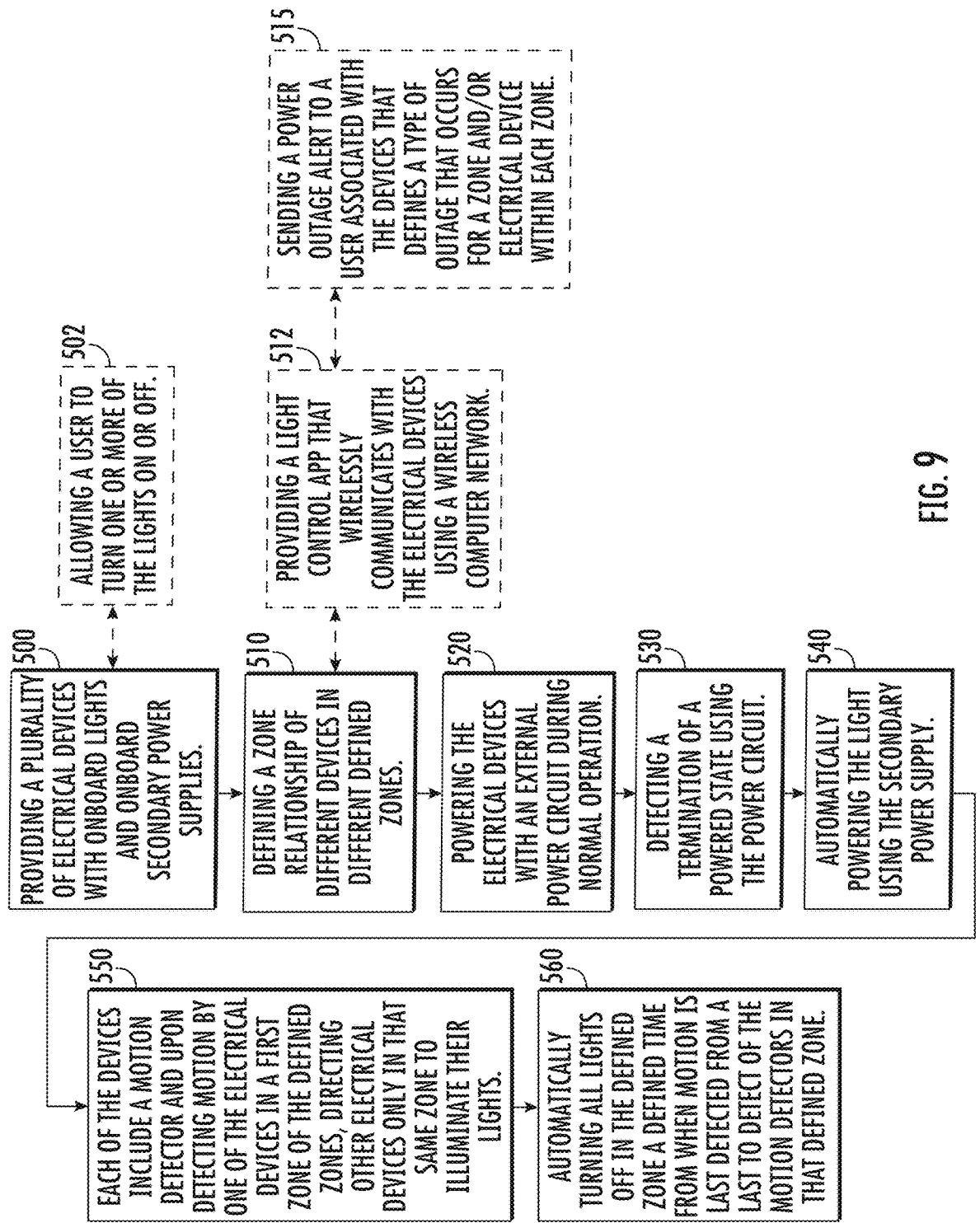
FIG. 9 is a flow chart of exemplary operations of operating a switch or power receptacle according to embodiments of the present invention.

FIG. 9 illustrates exemplary actions for lighting systems with synchronized lighting of zones in spaces of a building, such as an apartment, residence or office or even airport terminals. The actions may include providing a plurality of electrical devices with onboard lights and onboard secondary power supplies (block 500); defining a zone relationship of different devices in different defined zones (block 510); powering the electrical devices with an external power circuit during normal operation (block 520); detecting a termination of a powered state from or between the primary power circuit (block 530); and automatically powering the light using the secondary power supply (block 540). Each of the devices may include a motion detector and upon detecting motion by one of the electrical devices in a first zone of the defined zones, directing other electrical devices only in that same zone to illuminate their lights (block 550). The actions can include automatically turning all lights off in the defined zone a defined time from when motion is last detected from a last to detect of the motion detectors in that defined zone (block 560).

The system can be configured to allow a user to turn one or more of the lights On or Off (block 502).

The system can be configured to operate with a light control APP that wirelessly communicates with the electrical devices using a wireless computer network (block 512).

A power outage alert can be sent to a user associated with the devices that defines a type of outage that occurs for a zone and/or electrical device within each zone (block 515).

Turning now to FIGS. 10A-10C, the electrical device 10''', shown as a power receptacle 10*p*, can be configured to illuminate with one of a plurality of different, user-selectable, colors.

In some embodiments the selectable colors are selectable color temperatures of a respective color, shown as cool white, warm white, and neutral white, by way of example. To be clear, "white" is included in the term "color" although it may be considered a "shade" rather than a true color by some. The term "color temperature" is used broadly to refer to a visual change in appearance of a color from a first tone or hue to a second tone or hue.

The electrical device 10''' can be configured to output a plurality of predefined colors and/or color temperatures at the light output window 20*w* overlying the light source 20, whereby a user can toggle through the plurality to select one for current visual output.

The plurality of predefined colors and/or temperatures can be selected via a user touch input 45*t* via the light window (lens) 20*w* so that the electrical device 10''' provides a desired color (temperature) output.

The color output 220 can be provided so that one color temperature presents with a warmer (white) temperature 220$_2$, one temperature presents with a cooler (white) temperature 220$_1$ relative to a neutral (white) temperature 220$_3$. The cool temperature light output 220$_1$ may present a light output with increased luminosity relative the warm temperature output 220$_2$ and/or the neutral temperature output 220$_3$.

FIGS. 10A-10C also illustrate that the light output window 20*w* can be provided as a rectangle between plug-in electrical sockets 60$_1$, 60$_2$, according to some embodiments of the present invention.

Figure 11:
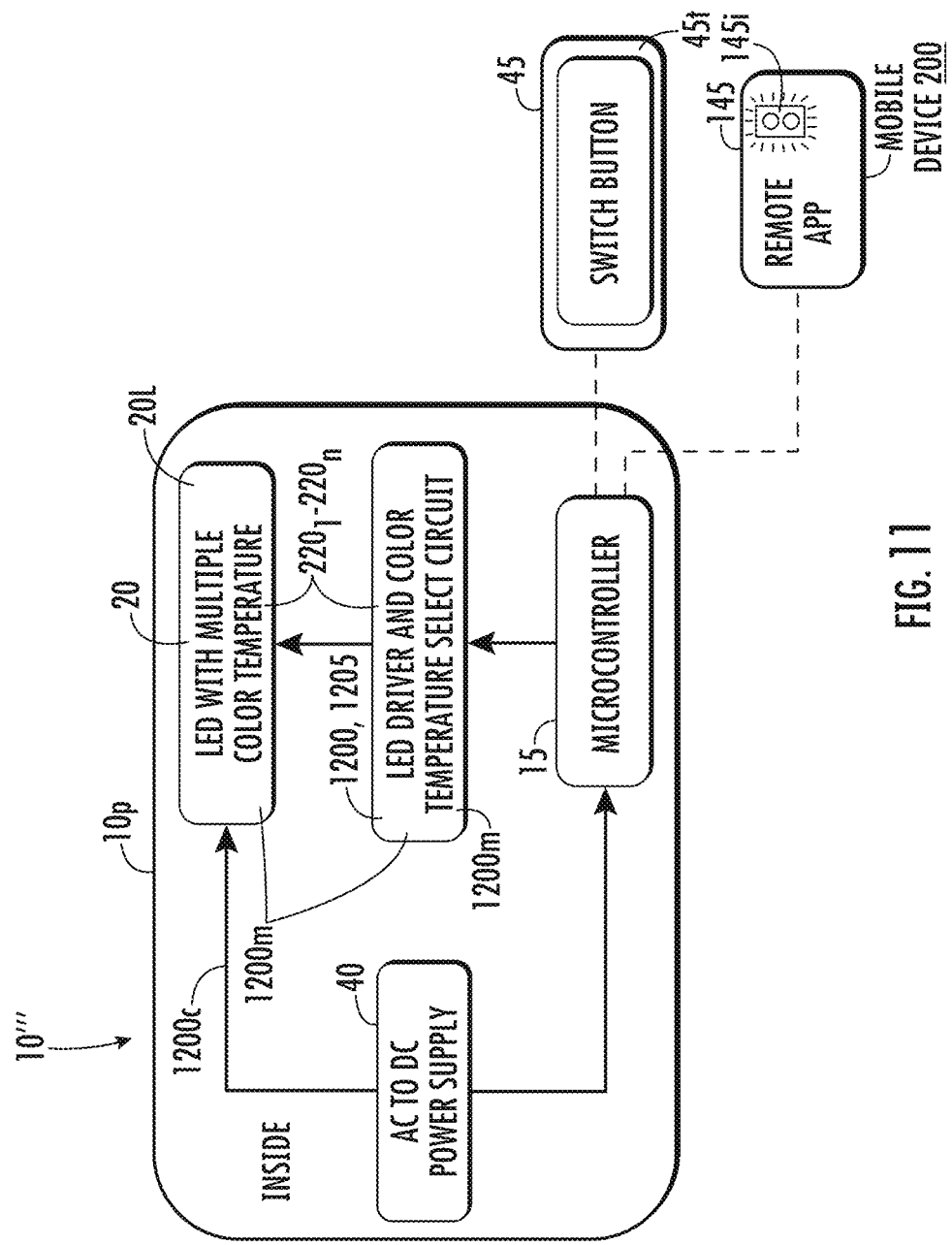
FIG. 11 is a block diagram of an example hardware configuration for a power receptacle with an adjustable light color and/or color tone output according to embodiments of the present invention.

FIG. 11 illustrates a block diagram of an example electrical device 10' providing a color (temperature) circuit 1200*c* configured to provide the multiple color temperatures 220 shown in FIGS. 10A-10C. The electrical device 10' can optionally be provided as a plug-in electrical power receptacle 10*p*. The color (temperature) circuit 1200*c* can include an AC to DC power supply 40 coupled to a light source module 1200*m* comprising at least one LED 20L as the light source 20, an LED driver 1200 and a color (temperature) select circuit 1205. The light source module 1200*m* can be coupled to a microcontroller 15 (which can also be coupled to the secondary power supply 25 (e.g., battery/or super capacitor). The power supply 40 can be coupled to the microcontroller 15 as well as the color temperature circuit 1200*c*. A user can change the color and/or color temperature by pressing the user input 45*t*, which can be configured as a push button interface, on an outer surface of the electrical device 10''' and/or provided as a remote software interface, such as via an APP 145, as discussed above with respect to FIG. 6.

Figure 12A:
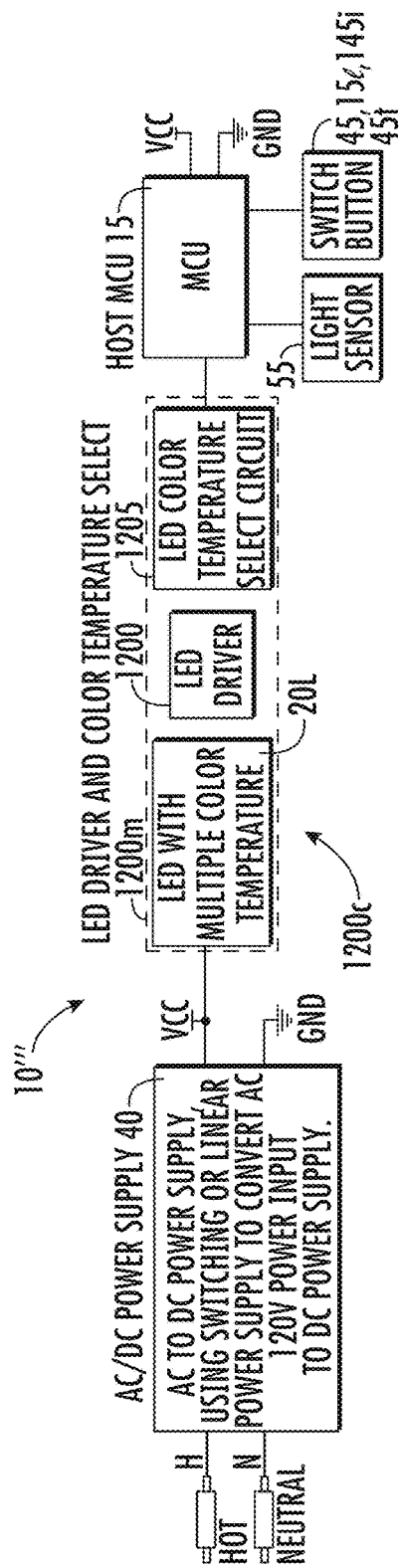
FIG. 12A is a circuit schematic of an example power receptacle with an LED driver and LED color temperature selectable control according to embodiments of the present invention.

FIG. 12A illustrates a circuit diagram of an electrical device 10''' providing the color (temperature) circuit 1200*c* with the color temperature module 1200*m* according to some embodiments. The color (temperature) circuit 1200*c*, similar to that discussed above with respect to FIG. 11, includes a power supply 40, the light source module 1200*m* with the at least one LED 20L, the LED driver 1200 and the color temperature select circuit 1205. The light source module 1200*m* is coupled to the microcontroller 15. The microcontroller can be coupled to a light sensor 55 and the user input 45 or multiple different user inputs such as other light control outputs 15*l*, APP interface 145*i*, and touch input 45*t*.

Figure 12B:
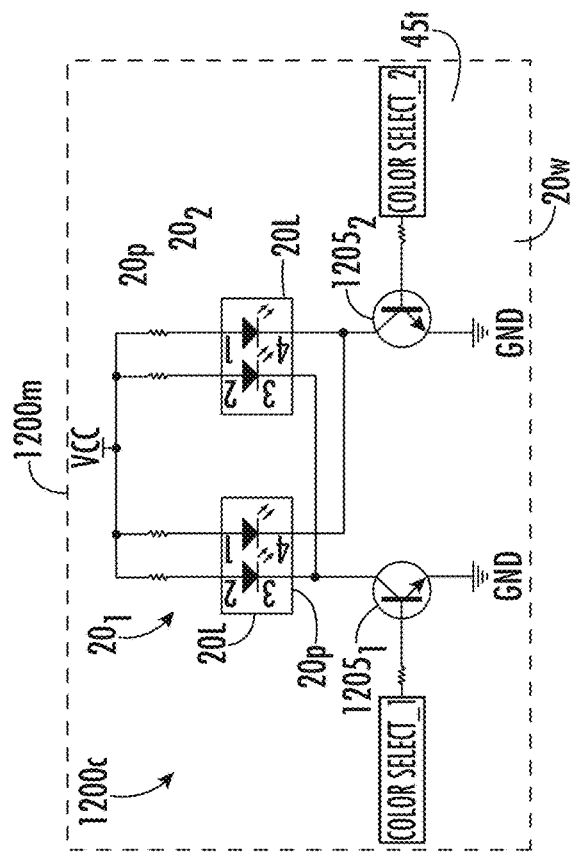
FIG. 12B illustrates an example LED module suitable for the circuit schematic shown in FIG. 12A according to embodiments of the present invention.

FIG. 12B illustrates an example of a portion of the color temperature circuit 1200*c* shown in FIG. 12A with the color temperature module 1200*m* comprising one or more LED 20L, e.g., comprising a plurality of LED die or a plurality of LEDs 20L. As shown, the color temperature circuit 1200*c* can comprise first and second sets 20*p* of LEDs 20L, with each set (optionally a pair) 20*p* of LEDs 20L coupled to a driver 1205$_1$, 1205$_2$. One set 20*p* of LEDs 20L is active when a first color temperature is selected and the other set 20*p* is active when a second color temperature is selected. All sets can be concurrently active to provide yet another color temperature(s).

Figure 13:
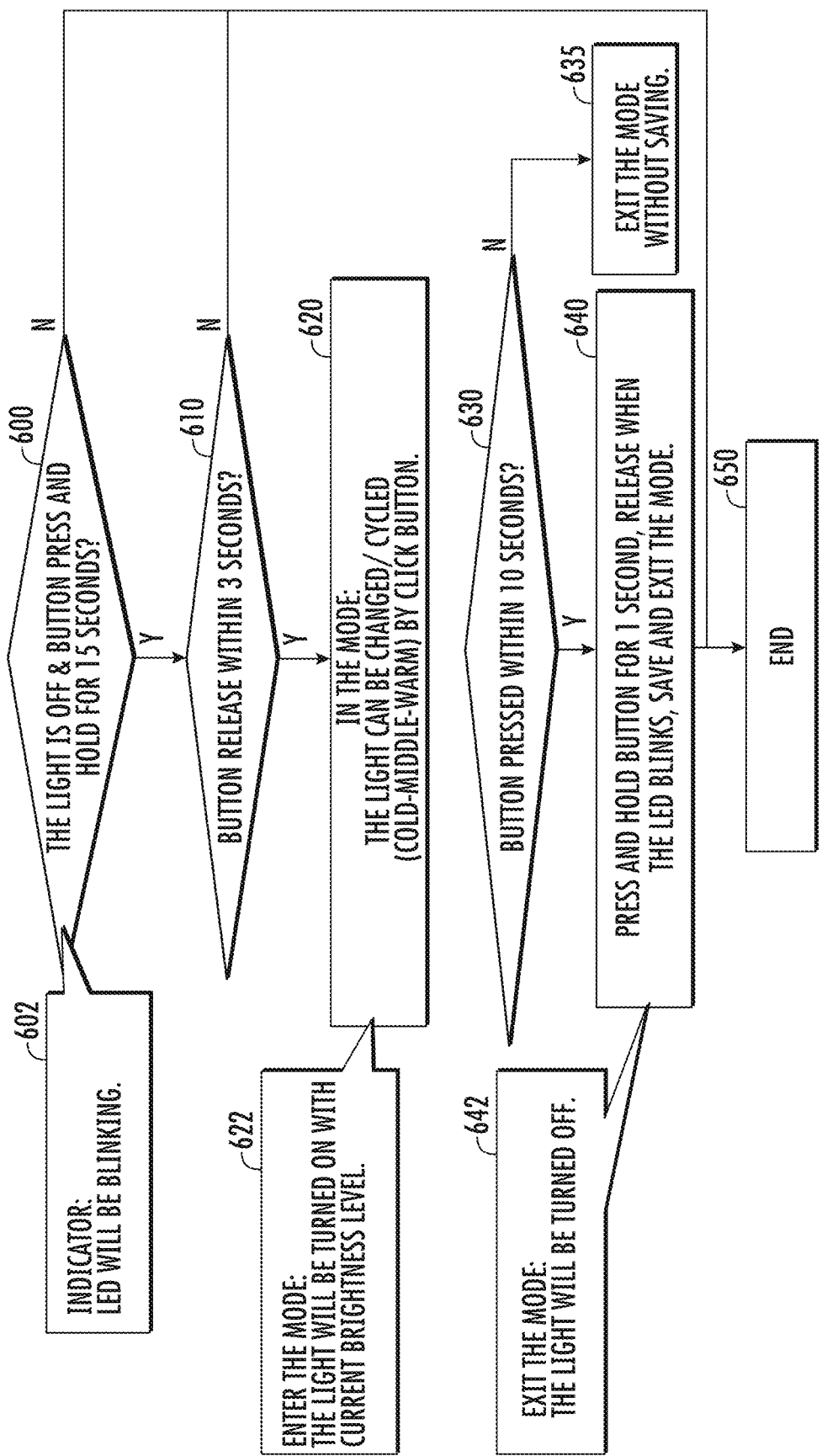
FIG. 13 is a flow chart of example actions that can be used for adjusting light tone and/or color output of a power receptacle according to embodiments of the present invention.

FIG. 13 is an example flow chart of actions that can be used for color (temperature) selection according to some particular embodiments of the present invention. To enter the light selection mode, when the light is off, a user can press and hold the user input button (which can optionally be the light lens touch button) for a defined time, such as 5-15 seconds to initiate the process (block 600). A user can apply a first user input to activate a color selection mode which turns off any of the at least one LED which is in a powered on/illuminating state prior to allowing the device to enter the color selection mode. As an indicator that the light color selection mode is active, the LED can blink (602). If the user input is released before the defined time of block 600, such as within 2-10 seconds, such as about 3 seconds, about 4 seconds or about 5 seconds, the light is turned off and the light selection mode ends (block 610). If the light selection mode is activated, the light can be changed by cycling/toggling through predefined light output settings (block 620). The click toggle button can change the setting and make a cycling change with several clicking actions to/of the button. The predefined settings can be color temperatures of cool, neutral, warm. Once the light selection mode is activated, the light can be turned on with a current or default light setting/brightness level (block 622). A user can press the user input button during the light selection cycle within a defined time, such as about 10 seconds (block 630). If the user input button is pressed during the light selection cycle within the defined time, a user can then press and hold for another defined, shorter time, such as 1 second, and then release when the LED blinks to save and exit the light selection mode (block 640) and the mode is exited and the light turned off (block 642). If the user input button is not pressed within the defined time of block 630, the mode is exited without saving any light change selection (block 635). The light selection mode can end (block 650).

The light selection/change mode (e.g., LED color change mode) can be active both in a continue and step mode.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to That which is claimed is:

1. An electrical device comprising:
   a housing;
   a microcontroller in the housing comprising electrical inputs coupleable to an external primary power circuit;
   a secondary power source in the housing;
   a light coupled to the housing and coupled to the secondary power source, wherein the light is configured to provide externally visible illumination; and
   a color circuit coupled to the microcontroller,
   wherein the microcontroller is configured to detect when power from the primary power circuit is disrupted and direct the secondary power source to power the light,
   wherein the color circuit comprises at least one light emitting diode (LED), an LED driver and a light select circuit configured with a light selection mode, wherein, when the light selection mode is active, the color circuit cycles the at least one LED to serially output a plurality of different defined light outputs, and wherein the device further comprises a user input control that allows a user to select one of the plurality of different defined light outputs,
   wherein the device is a power receptacle comprising at least one electrical plug-in socket, wherein the device comprises a light lens window configured to allow the at least one LED to illuminate light therethrough, and wherein the user input is a touch input provided by the light lens window to the microcontroller.

2. The device of claim 1, wherein the power receptacle comprises an AFCI and/or GFCI.

3. The device of claim 1, further comprising a light control user input in communication with the microcontroller.

4. The device of claim 1, further comprising a motion detection sensor coupled to the microcontroller.

5. The device of claim 1, further comprising a light sensor coupled to the microcontroller.

6. The device of claim 1, further comprising a sync module interface provided by the microcontroller and/or coupled to the microcontroller.

7. The device of claim 1, further comprising a transceiver coupled to or provided by the microcontroller, wherein the device is configured to communicate over a low energy RF network.

8. The device of claim 1, wherein the device further comprises a USB device and/or a switch device.

9. The device of claim 1, further comprising a charge control circuit coupled to the microcontroller, the secondary power source and the light.

10. The device of claim 1, further comprising a switch coupled to the microcontroller that electrically connects and electrically disconnects the secondary power source from the light, wherein the switch is operable by user input either via an external manual switch and/or an electronic user input whereby a user can turn the light on or off.

11. The device of claim 1, wherein the plurality of different defined light outputs comprise a plurality of different color temperatures for a respective color, optionally white.

12. The device of claim 1, wherein the at least one LED comprises first and second sets of LEDs which are configured to be serially activated to generate first and second light outputs of the plurality of different defined light outputs.

13. A lighting system comprising:
   a plurality of electrical devices, each comprising a microcontroller, a light source, a motion detector and an onboard secondary power supply, wherein a respective microcontroller is configured to direct a corresponding electrical device to electrically disconnect the light from the secondary power supply or electrically connect the light source to the secondary power supply,
   wherein each of the plurality of electrical devices are electronically assignable to one of a plurality of different zone locations correlated to different defined subspaces of a larger physical space,
   wherein all electrical devices assigned to a respective zone location wirelessly communicate with each other in that zone location so that motion detected by one electrical device in the respective zone location causes other of the electrical devices in that respective zone location to turn corresponding lights On,
   wherein the electrical devices further comprise a color circuit coupled to the microcontroller, wherein the light source comprises at least one light emitting diode (LED), wherein the color circuit comprises an LED driver and a light select circuit configured with a light selection mode that, when active, cycles the at least one LED to serially output a plurality of different defined light outputs, and wherein the device comprises a user input control that allows a user to select one of the plurality of different defined light outputs,
   wherein the electrical devices are power receptacles comprising at least one electrical plug-in socket, wherein the electrical device comprises a light lens window configured to allow the at least one LED to illuminate light therethrough, and wherein the user input is a touch input provided by the light lens window to the microcontroller.

14. The lighting system of claim 13, further comprising a sync module that wirelessly communicates with the plurality of electrical devices over a computer network.

15. The lighting system of claim 14, wherein the electrical devices communicate with each other over a low energy RF network.

16. The lighting system of claim 13, wherein each of the plurality of electrical devices is configured to couple to a primary power circuit of a private or public power grid to provide a primary power source for the electrical device.

17. The lighting system of claim 16, wherein the system comprises a user interface provided by a light control APP on a mobile device of a user whereby the user can turn a light of a selected electrical device On or Off and can check an operative status of lights of different electrical devices in different zone locations.

18. The lighting system of claim 16, wherein each light of the plurality of electrical devices are remotely controllable by a user over a wireless computer network, and wherein the system further comprises a light control APP on a mobile device of the user whereby a user can check power status of the primary power circuit via a light control APP on the mobile device of the user.

19. The lighting system of claim 13, wherein the electrical device in the respective zone location that detects a motion using its motion sensor, sends a low power RF signal to the other electrical devices in that respective zone location to turn their lights On, and wherein lights of the electrical devices in other zones locations remain Off until a motion is detected by a motion detector of an electrical device in one or more of the other zone locations.

20. The lighting system of claim 13, wherein the electrical devices are power receptacles.

21. The system of claim 13, wherein the plurality of different defined light outputs comprise a plurality of different color temperatures for a respective color, optionally white.

22. The system of claim 13, wherein the at least one LED comprises first and second sets of LEDs which are configured to be serially activated to generate first and second light outputs of the plurality of different defined light outputs.

23. A method of lighting spaces, comprising:
providing a plurality of electrical devices, each with at least one light, a motion detector, and an onboard secondary power supply;
defining a zone relationship of different electrical devices in different defined zones;
powering the electrical devices with an external primary power circuit during normal operation;
detecting a termination of a powered state of one or more of the electrical devices from power provided by the primary power circuit;
automatically powering the light of the one or more electrical devices using a corresponding secondary power supply; and
upon detecting motion by one of the electrical devices in a first zone of the defined zones, automatically electronically directing other electrical devices only in the first zone to turn On and illuminate their lights,
wherein the electrical devices are AFCI power receptacles, GFCI power receptacles, or AFCI/GFCI power receptacles,
wherein the method further comprises identifying a type of power outage including a first type of power outage that is identifiable as an internal power disruption caused by an AFCI or GFCI fault and a second type of power outage that is identifiable as a power outage upstream of the power receptacles.

24. A method of allowing a user to select a color and/or a color temperature of a light of an electrical device, comprising:
providing an electrical device comprising at least one light emitting diode (LED), at least one LED driver, a light lens window and a microcontroller;
accepting a first user input to activate a color selection mode which turns off any of the at least one LED which is in a powered on/illuminating state prior to allowing the device to enter the color selection mode;
when the at least one LED is not illuminating and/or accepting a first user input which activates a color selection mode and turns off all LEDs;
illuminating the at least one LED light in a blinking pattern through the light lens window in response then to the first user input;
illuminating the at least one LED to generate a different light output at a current or default brightness level, optionally at a constant illumination light output through the light lens window, to indicate activation of the color selection mode;
cycling through a plurality of different defined colors and/or color temperatures of light outputs which are serially illuminated through the light lens window;
accepting a second user input to select one of the different defined colors and/or color temperatures of light outputs; and
exiting the color selection mode and turning off the at least one LED.

\* \* \* \* \*